US008612376B2

(12) United States Patent
Yamagaki et al.

(10) Patent No.: US 8,612,376 B2
(45) Date of Patent: Dec. 17, 2013

(54) SYSTEM FOR GENERATING CHARACTER-STRING MATCHING FINITE AUTOMATION, ITS GENERATING METHOD, AND GENERATING PROGRAM

(75) Inventors: Norio Yamagaki, Tokyo (JP); Kiyohisa Ichino, Tokyo (JP); Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 1190 days.

(21) Appl. No.: 12/521,636

(22) PCT Filed: Dec. 28, 2007

(86) PCT No.: PCT/JP2007/075286
§ 371 (c)(1),
(2), (4) Date: Jun. 29, 2009

(87) PCT Pub. No.: WO2008/081932
PCT Pub. Date: Jul. 10, 2008

(65) Prior Publication Data
US 2010/0325157 A1    Dec. 23, 2010

(30) Foreign Application Priority Data
Dec. 28, 2006  (JP) ................................. 2006-355533

(51) Int. Cl.
*G06F 17/00* (2006.01)
*G06N 7/00* (2006.01)
*G06F 7/00* (2006.01)
(52) U.S. Cl.
USPC ............................................. 706/48; 706/20
(58) Field of Classification Search
USPC .......................................................... 706/48
See application file for complete search history.

(56) References Cited

U.S. PATENT DOCUMENTS 7,185,081 B1 * 2/2007 Liao ............................. 709/224

FOREIGN PATENT DOCUMENTS

JP  03-080366  4/1991
JP  2003-242179  8/2003

OTHER PUBLICATIONS

International Search Report—PCT/JP2007/075286—Jan. 29, 2008.
Masato Ono et al—The efficient realization approach of a NFA pattern matching circuit with data compression technique—Graduate School of System and Information Technology, University of Tsukuba—IEICE Technical Report CPSY2005-21(Aug. 5, 2005)—p. 37-42.
Seiki Hyogen—Regular Expression.

(Continued)

*Primary Examiner* — Jeffrey A Gaffin
*Assistant Examiner* — Nathan Brown, Jr.
(74) *Attorney, Agent, or Firm* — Young & Thompson

(57) ABSTRACT

Disclosed is a system in which Aan NFA conversion meansunit 21, receives the number of simultaneous/parallel processing characters from an input device 1 and, using a one-character transition finite automaton description matrix stored in an NFA description matrix storage unit 31 and a description matrix which is stored in an NFA conversion result matrix storage unit 32 as an intermediate conversion result, converts the finite automaton to a finite automaton whose transition condition is described in the number of characters subjected to simultaneous/parallel processing. The NFA conversion means 21 sequentially stores the intermediate result in the NFA conversion result matrix storage unit 32. When the conversion is completed, a result output meansunit 22 reads the resulting NFA description matrix from the NFA conversion result matrix storage unit 32 and outputs it to an output device 4.

20 Claims, 13 Drawing Sheets

(56) References Cited

OTHER PUBLICATIONS

Reetinder Sidhu et al.—Fast Regular Expression Matching using FPGAs—Department of EE-Systems, University of Southern California, Los Angeles CA 90089—Proceedings of the 9th Annual IEEE Symposium on Field-Programmable Custom Computing Machines—2001—12 pgs.

Peter Sutton—Partial Character Decoding for Improved Regular Expression Matching in FPGAs—School of Information Technology and Electrical Engineering The University of Queensland—2004—p. 25-32.

Christopher R. Clark et al.—Scalable Pattern Matching for High Speed Networks—School of Electrical and Computer Engineering Georgia Institute of Technology, Atlanta GA—Proceeding of the 12th Annual IEEE Symposium on Field-Programmable Custom Computing Machines—2004—9 pgs.

Toshihiro Katashita et al—Fast and Compact NFA Pattern Matching Circuit Using FPGAs—Systems and Information Engineering, University of Tsukuba—Information Technology Research Institute, National Institute of Advanced Industrial Science and Technology—Aug. 2005—pp. 120-128.

* cited by examiner

SYSTEM FOR GENERATING CHARACTER-STRING MATCHING FINITE AUTOMATION, ITS GENERATING METHOD, AND GENERATING PROGRAM

CROSS-REFERENCE TO RELATED APPLICATIONS

The present invention claims priority from Japanese patent application 2006-355533 (filed on Dec. 28, 2006) the content of which is hereby incorporated in its entirety by reference into this specification.

TECHNICAL FIELD

The present invention relates to a technology for generating a finite automaton for character string matching, and more particularly to a finite automaton generation system, method, and generation program for character string matching that can perform character string matching by receiving multiple characters of a string simultaneously and in parallel.

BACKGROUND ART

Conventionally, regarding a finite automaton for character string matching (pattern matching), there has been employed a method using a Non-deterministic Finite Automaton (NFA) that allows multiple transition destinations from one state for the same character, or a method using a Deterministic Finite Automaton (DFA) that does not allow multiple transition destinations.

For example, an NFA can be generated based on a syntax tree constructed from the search target condition, such as a given regular expression, as described in Patent Document 1 and Non-Patent Document 1, A DFA can be generated using an NFA.

In general, with the state of a NFA or a DFA saved in a memory, software-based pattern matching is performed by retrieving the state information from the memory each time a state transition occurs. In this case, when an input character is received, an NFA has multiple states as the destinations of transitions from one state and, so, it is impossible to determine to which state the NFA should move to produce a correct result. Therefore, the NFA moves to one of the states to perform processing and, if the processing fails, moves to another state using the backtrack method.

On the other hand, a DFA has only one transition destination from one state when an input character is received, meaning that a DFA has advantages in that the processing is performed faster than an NFA but has disadvantages in that the number of states is larger than that of an NFA and, so, a large amount of memory is required.

To solve such software-based pattern matching problems, an NFA-based high-speed pattern matching method is recently introduced in which an NFA is built directly into a hardware circuit to take full advantage of high-speed processing due to parallel operations (Non-Patent Document 2). Another method is that a higher search throughput is achieved by increasing the number of input characters that can be processed in one clock cycle (Non-Patent Document 3). A still another method is also proposed in which the search throughput is increased by performing NFA state transition condition with multiple characters so that a character string of multiple characters are received simultaneously (Non-Patent Document 4, Non-Patent Document 5).

Patent Document 1:
Japanese Patent Kokai Publication No. JP-P2003-242179A (paragraphs 20-34, FIG. 1-FIG. 9)
Non-Patent Document 1:
Standard text: Algorithm and Data Structure for C Programmers (pp. 297-330, Yoshiyuki Kondo, 1998)
Non-Patent Document 2:
Proceedings of the 9th Annual IEEE Symposium on Field-Programmable Custom Computing Machines (pp. 227-238, Reetinder Sidhu, Viktor K. Prasanna, 2001)
Non-Patent Document 3:
Proceedings of 2004 IEEE International Conference on Field-Programmable Technology (pp. 25-32, Peter Sutton, 2004)
Non-Patent Document 4:
Proceedings of the 12th Annual IEEE Symposium on Field-Programmable Custom Computing Machines (pp. 249-257, Christopher R. Clark, David F. Schimmel, 2004)
Non-Patent Document 5:
Journal of the Information Processing Society of Japan: Computing system Vol. 46, No. SIG12 (ASCII) (pp. 120-128, Toshihiro Katashita, Atsushi Maeda, Masato Ono, Kenji Toda, and Yoshinori Yamaguchi, 2005)

SUMMARY

All the disclosed contents of Patent Document 1 and Non-Patent Documents 1-5 given above are hereby incorporated by reference into this specification. The following analysis of the related art is given by the present invention. The method for building an NFA directly into hardware for pattern matching, such as one described above, has the following several problems.

A first problem is that simply building an NFA, generated from a regular expression, into hard ware does not ensure a higher search throughput.

The reason is that, because the state transition condition for a built-in NFA is a condition for one input character of a search character string, only the one-character search can be performed per clock cycle.

A second problem is that simply increasing the number of search characters per clock cycle without changing a one-character transition NFA, such as the one described above, does not lead directly to an increase in the search throughput.

The reason is that simply increasing the number of search characters per clock cycle increases the length of the path by the number of simultaneously-processed characters and increases the period of a clock cycle, resulting in a decrease in the operating frequency. That is, if the number of characters is quadrupled, the operating frequency may be decreased to ¼ or lower.

A third problem is that the present method for using an NFA with multi-character state transition condition cannot be used to search a flexible character string such as a regular expression.

The reason is that the method is designed, not for an NFA composed of a regular expression and including loops, but only for a simple character string search (exact match) generated by expanding an NFA for excluding loops.

A fourth problem is that the number of states is increased when an NFA state transition condition is expanded to multiple characters.

The reason is that NFAs of the same number as that of characters to be processed are generated, considering the offset of the number of characters that are simultaneously processed.

Therefore, a first problem to be solved by the present invention is to provide a generation system, a generation method, and a generation program for a finite automaton for use in quickly searching a flexible character string represented, for example, by a regular expression.

In addition, a second problem to be solved by the present invention is to provide a generation system, a generation method, and a generation program that generate a finite automaton adjusted for the simultaneous, parallel processing of any number of characters from a search target for which a one-character transition NFA can constructed.

In addition, a third problem to be solved by the present invention is to provide a generation system, a generation method, and a generation program that generate a finite automaton adjusted for the number of characters for simultaneous, parallel processing without increasing the number of one-character transition NFA states.

The present invention provides a finite automaton generation system (method, program) that increases the number of characters of a finite automaton transition condition including a transition condition with a fixed number of characters, to any specified number of characters. The finite automaton is described in a matrix form. In the present invention, the increasing means does not change the number of states of an original finite automaton. Alternatively, in the present invention, the increasing means operates according to a matrix operation having a predefined operation rule. Alternatively, in the present invention, the increasing means applies a predefined operation rule to a matrix operation in which multiple sub-matrices are used. In the present invention, the matrix operation, in which multiple sub-matrices are used, generates and uses sub-matrices each time the operation is performed. Alternatively, in the present invention, the matrix operation, in which multiple sub-matrices are used, may generate sub-matrices in advance and uses the sub-matrices.

A finite automaton generation system in accordance with a first aspect of the present invention comprises an NFA description matrix storage unit (31 in FIG. 1) that stores a matrix describing a one-character transition NFA in advance; an NFA conversion unit (21 in FIG. 1) that performs conversion to an NFA for the specified number of characters subjected to simultaneous/parallel processing by repeating processing in which a one-character transition NFA description matrix or a p-character transition NFA description matrix is read, as necessary, from the NFA description matrix storage unit (31 in FIG. 1) or an NFA conversion result matrix storage unit (32 in FIG. 1), respectively, and the generated matrix is stored again in the NFA conversion result matrix storage unit (32 in FIG. 1); the NFA conversion result matrix storage unit (32 in FIG. 1) that stores the converted NFA description matrix; and a result output unit (22 in FIG. 1) that outputs the converted NFA.

A finite automaton generation system in accordance with a second aspect of the present invention comprises an NFA description matrix storage unit (31 in FIG. 6) that stores a matrix describing a one-character transition NFA in advance; an NFA conversion result matrix storage unit (32 in FIG. 6) that stores a converted NFA description matrix; an NFA conversion unit (23 in FIG. 6); and a result output unit (22 in FIG. 6): The NFA conversion unit (23 in FIG. 6) generates an NFA for the specified number of characters subjected to simultaneous/parallel processing by repeating processing in which a one-character transition NFA description matrix or a p-character transition NFA description matrix is read, as necessary, from the NFA description matrix storage unit (31 in FIG. 6) or the NFA conversion result matrix storage unit (32 in FIG. 6), respectively, the NFA description matrix, which has been read, is divided into multiple sub-matrices to generate a k-character transition NFA description matrix, and the generated matrix is stored again in the NFA conversion result matrix storage unit (32 in FIG. 6).

A finite automaton generation system in a third aspect of the present invention comprises NFA description matrix division unit (24 in FIG. 9) that divides a matrix describing an finite automaton stored in the NFA description matrix storage unit (31 in FIG. 9) into multiple sub-matrices; an NFA conversion unit (25 in FIG. 9) that performs conversion in which the number of characters of the transition condition of the original finite automaton is increased using the divided multiple sub-matrices; an NFA conversion result matrix storage unit (32 in FIG. 9) that stores a finite automaton description matrix halfway-converted by the NFA conversion unit; an NFA conversion result sub-matrix storage unit (33 in FIG. 9) that stores the multiple sub-matrices of the finite automaton description matrix halfway-converted by the NFA conversion unit; and a result output unit (22 in FIG. 9) that outputs a finite automaton description matrix whose transition condition has its number of characters increased to any specified number of characters.

The first to third finite automaton generation systems of the present invention employ the configurations described above to convert a one-character transition NFA description matrix through the matrix operation for solving the first to third problems.

A finite automaton generation system in accordance with a fourth aspect of the present invention has NFA description matrix generation unit (26 in FIG. 12), which generates an NFA description matrix from a received regular expression, in addition to the configuration of the first, second, or third finite automaton generation system. Even if a one-character transition NFA description matrix is not prepared in advance but if a one-character transition NFA may be built from a search target, employing such a configuration allows for conversion to an NFA for the number of characters subjected to simultaneous/parallel processing by generating the NFA from the search target. Note that the reference numerals in the drawings, shown in parentheses above, are used to show the correspondence between the present invention and the configuration of the embodiments and that they do not, of course, limit the present invention.

A first effect is that a one-character transition finite automaton, stored in advance, can be converted to a finite automaton for use in a character string search in the multi-character, simultaneous/parallel processing.

The reason is that a one-character transition finite automaton is described as a predetermined matrix and NFA conversion unit converts the one-character transition finite automaton to a finite automaton that has a transition condition for the number of characters subjected to simultaneous/parallel processing and, after that, stores the converted finite automaton in the NFA conversion result matrix storage unit.

A second effect is that a one-character transition finite automaton is described as a predetermined matrix to facilitate conversion processing and to always allow the similar processing to be performed.

The reason is that a one-character transition finite automaton is described as a matrix, including its initial state or its final state, to allow the NFA conversion unit to perform matrix operation addition, the NFA conversion unit performs conversion by taking advantage of the matrix operation, eliminating the need to serially repeat the processing that is performed before a finite automaton is converted to a finite automaton having a transition condition for a desired number of characters subjected to simultaneous/parallel processing.

A third effect is that the limitation on a convertible search target is greatly reduced. This unit that, if a one-character transition finite automaton, such as a regular expression, may be generated from a search target, the finite automaton of any search target can be converted to a finite automaton having a transition condition for a desired number of characters subjected to simultaneous/parallel processing.

The reason is that the NFA description matrix generation unit can convert a regular expression always to a one-character transition NFA and, in addition, the NFA conversion unit, which performs conversion, performs conversion for the finite automaton, which is described as a matrix, without considering the regular expression that is the search target.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Next, exemplary embodiments of the present invention will be described in detail below with reference to the drawings.

Figure 1:
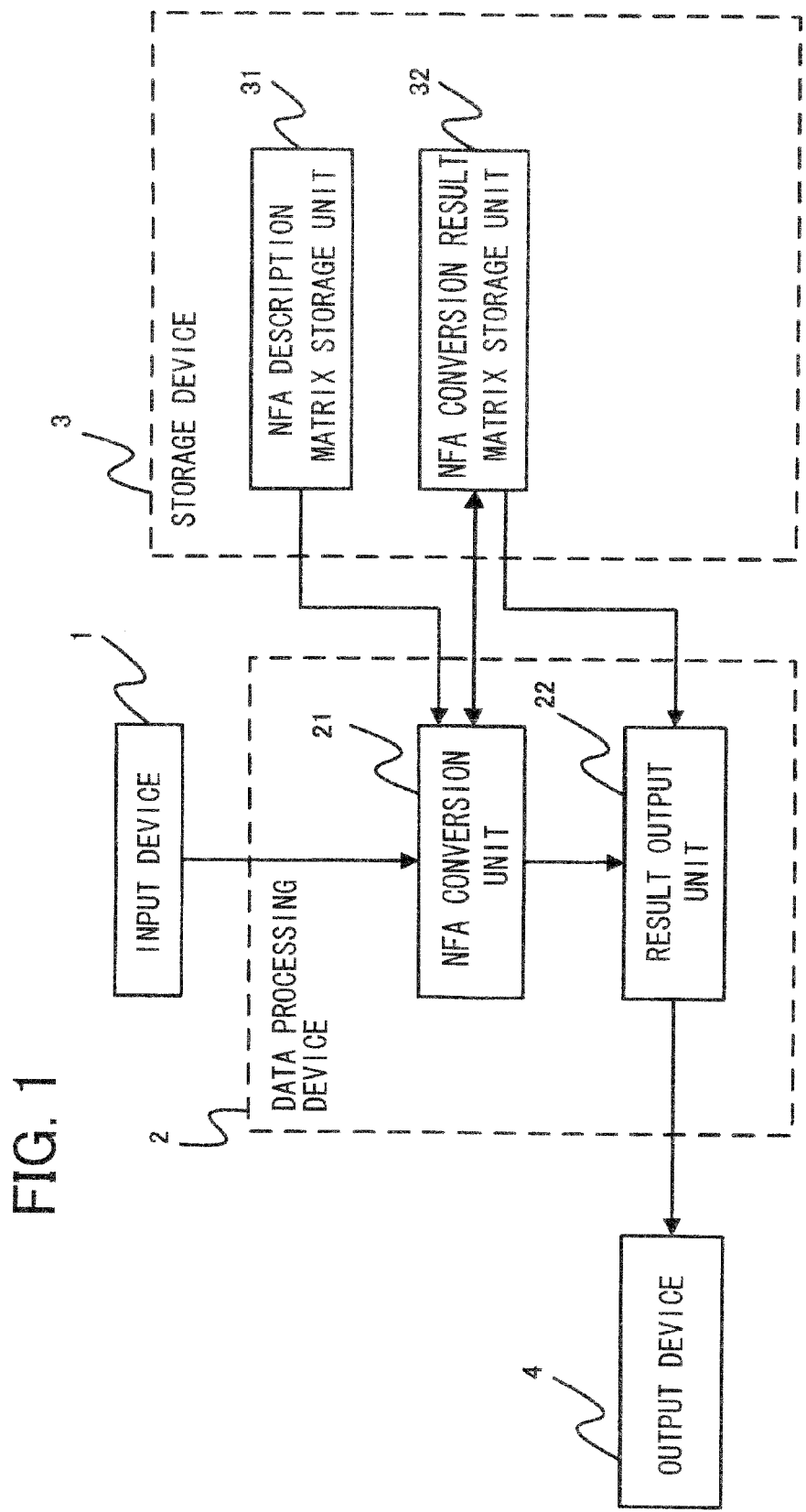
FIG. 1 is a block diagram showing the configuration of a first exemplary embodiment of the present invention.

FIG. 1 is a block diagram showing the configuration of a first exemplary embodiment for carrying out the present invention.

Referring to FIG. 1, the first exemplary embodiment of the present invention includes an input device 1 such as a keyboard, a data processing device 2 that performs operation under program control, a storage device 3 that stores information, and an output device 4 such as a display device or a print device.

The storage device 3 comprises an NFA description matrix storage unit 31 and an NFA conversion result matrix storage unit 32.

The NFA description matrix storage unit 31 stores, in advance, a one-character transition NFA, constructed from a regular expression and so forth, in the form of the NFA description matrix S.

The NFA conversion result matrix storage unit 32 stores k-character transition NFA description matrix $M_k$ created by the NFA conversion unit by converting the one-character transition NFA description matrix S.

The data processing device 2 comprises an NFA conversion unit 21 and a result output unit 22.

The NFA conversion unit 21 reads a one-character transition NFA description matrix S or a p-character transition NFA description matrix $M_p$ as necessary from the NFA description matrix storage unit 31 or the NFA conversion result matrix storage unit 32, respectively, generates a k-character transition NFA description matrix $M_k$ using the description matrix that has been read, and stores the generated matrix $M_k$ in the NFA conversion result matrix storage unit 32 again. This processing is repeated according to the value of the number of characters subjected to simultaneous/parallel processing, m, received from the input device 1 until the m-character transition NFA description matrix $M_m$ is generated.

The result output unit 22 reads the m-character transition NFA description matrix from the NFA conversion result matrix storage unit 32 and outputs the NFA description matrix or the state transition diagram, created by converting the matrix, to the output device 4. It is of course possible to implement the processing and function of the NFA conversion unit 21 and the result output unit 22 by the programs executed on the data processing device 2.

Figure 2:
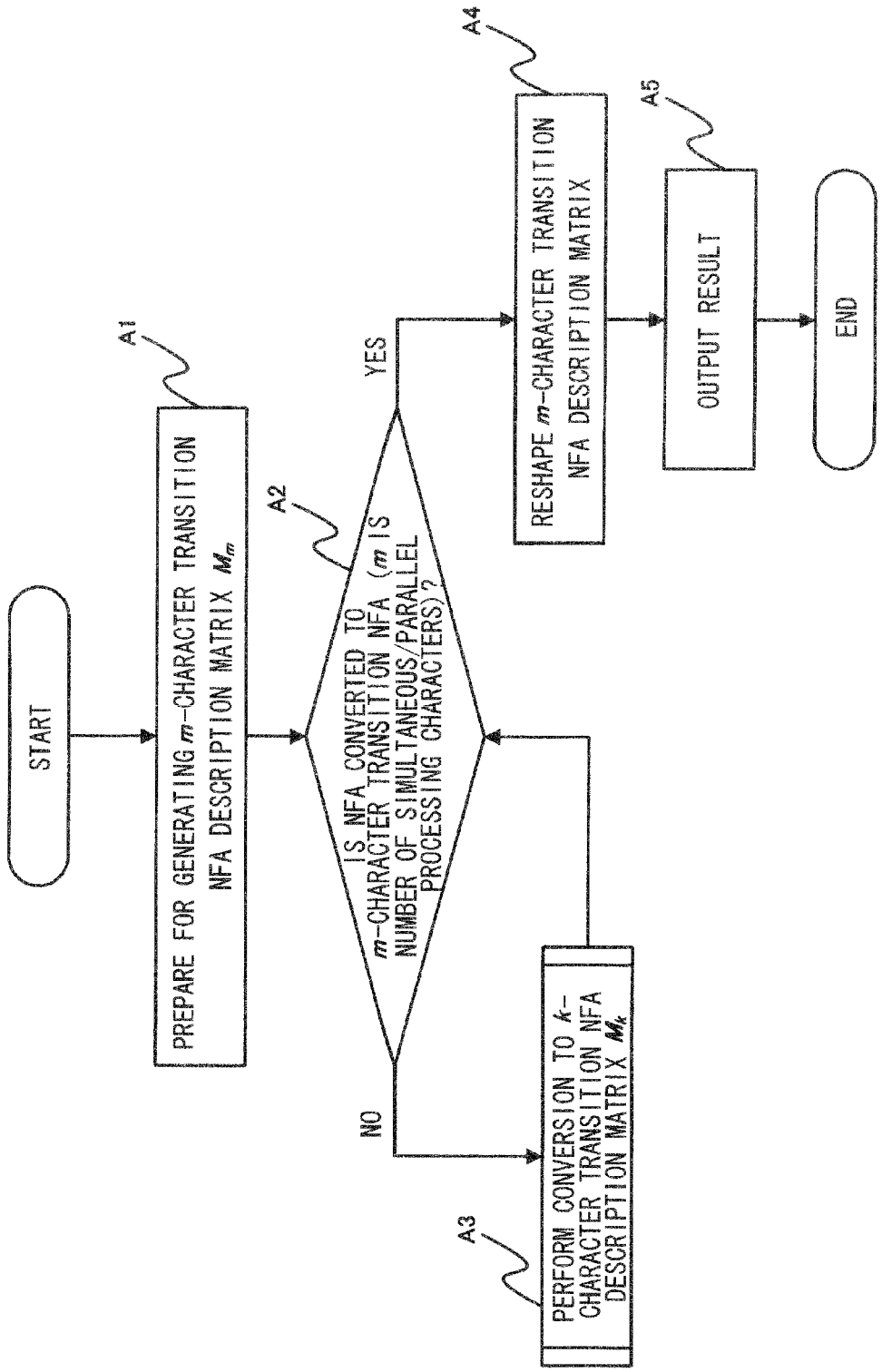
FIG. 2 is a flowchart showing the operation of the first exemplary embodiment of the present invention.

Next, the operation of the first exemplary embodiment for carrying out the present invention will be described with reference to FIG. 1 and FIG. 2.

The number of characters subjected to simultaneous/parallel processing, m, received from the input device 1, is supplied to the NFA conversion unit 21. First, to prepare for generating a desired m-character transition NFA description matrix $M_m$, the NFA conversion unit 21 sets the variable k to 1, sets the one-character transition NFA description matrix S, read from the NFA description matrix storage unit 31, to the matrix $M_1$, and stores the matrix $M_1$ in the NFA conversion result matrix storage unit 32 (step A1).

The following describes a one-character transition NFA description matrix $S=\{s_{ij}\}$ i=1, ..., n, j=1, ..., n and a k-character transition NFA description matrix $M_k=\{mk_{ij}\}$ i=1, ..., n, j=1, ... n for an NFA that has n states. First, the row i i=1, ..., n or column i i=1, ..., n of the NFA description matrix corresponds to one of the N states of the NFA, and each element $s_{ij}$, $mk_{ij}$ represents a set of characters or character strings that is a transition condition from the state corresponding to row column i to the state corresponding to row j, column j. In this matrix, the symbol " " is used to represent multiple conditions, and the symbol "*" is used to represent an arbitrary character.

In addition, element $s_{ii}$ has $i_s$ when the state corresponding to row i or column i is the initial state, and element $s_{ii}$ has $f_s$ when the state corresponding to row i or column i is the final state. For example, when an NFA that has state 0 to state 4 is constructed as the NFA of the regular expression "a(bc)*

Figure 3:
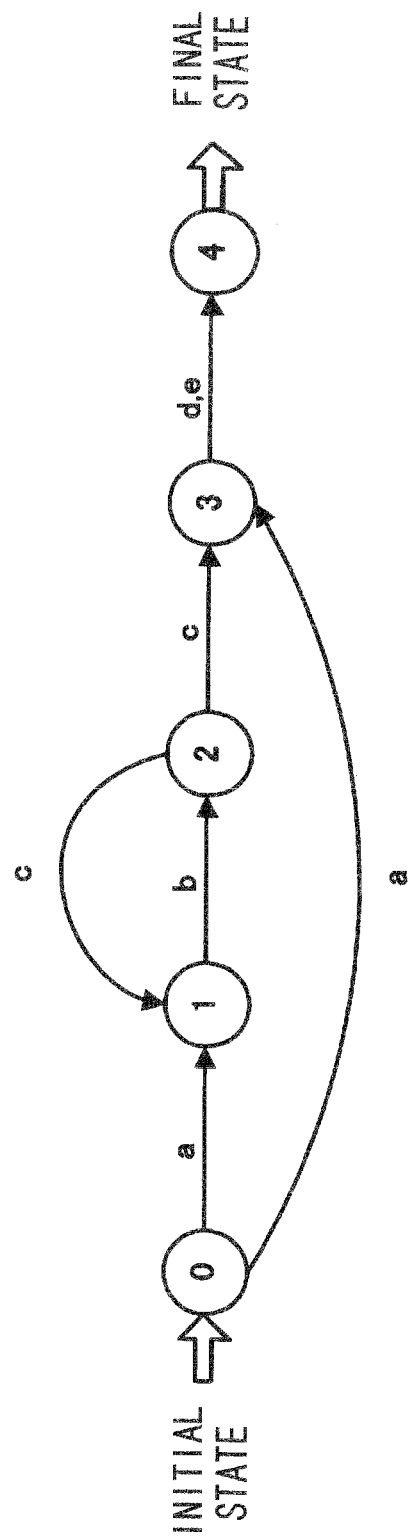
FIG. 3 is a diagram showing a one-character transition NFA description matrix of the present invention.

(d|e)" as shown in FIG. 3 and the state i(i=0, . . . , 4) corresponds to row i+1, the description matrix S is represented as [Expression 1].

$$S = \begin{bmatrix} i_s & a & 0 & a & 0 \\ 0 & 0 & b & 0 & 0 \\ 0 & c & 0 & c & 0 \\ 0 & 0 & 0 & 0 & d+e \\ 0 & 0 & 0 & 0 & f_s \end{bmatrix} \quad \text{[Expression 1]}$$

After the processing described above (step A1), the NFA conversion unit 21 compares the variable k and the number of characters subjected to simultaneous/parallel processing, in (step A2). If the number of characters subjected to simultaneous/parallel processing, m, is larger than the variable k, the processing of conversion to the k-character transition NFA is performed judging that the NFA is not yet converted to the desired m-character transition NFA. (step A3).

Figure 4:
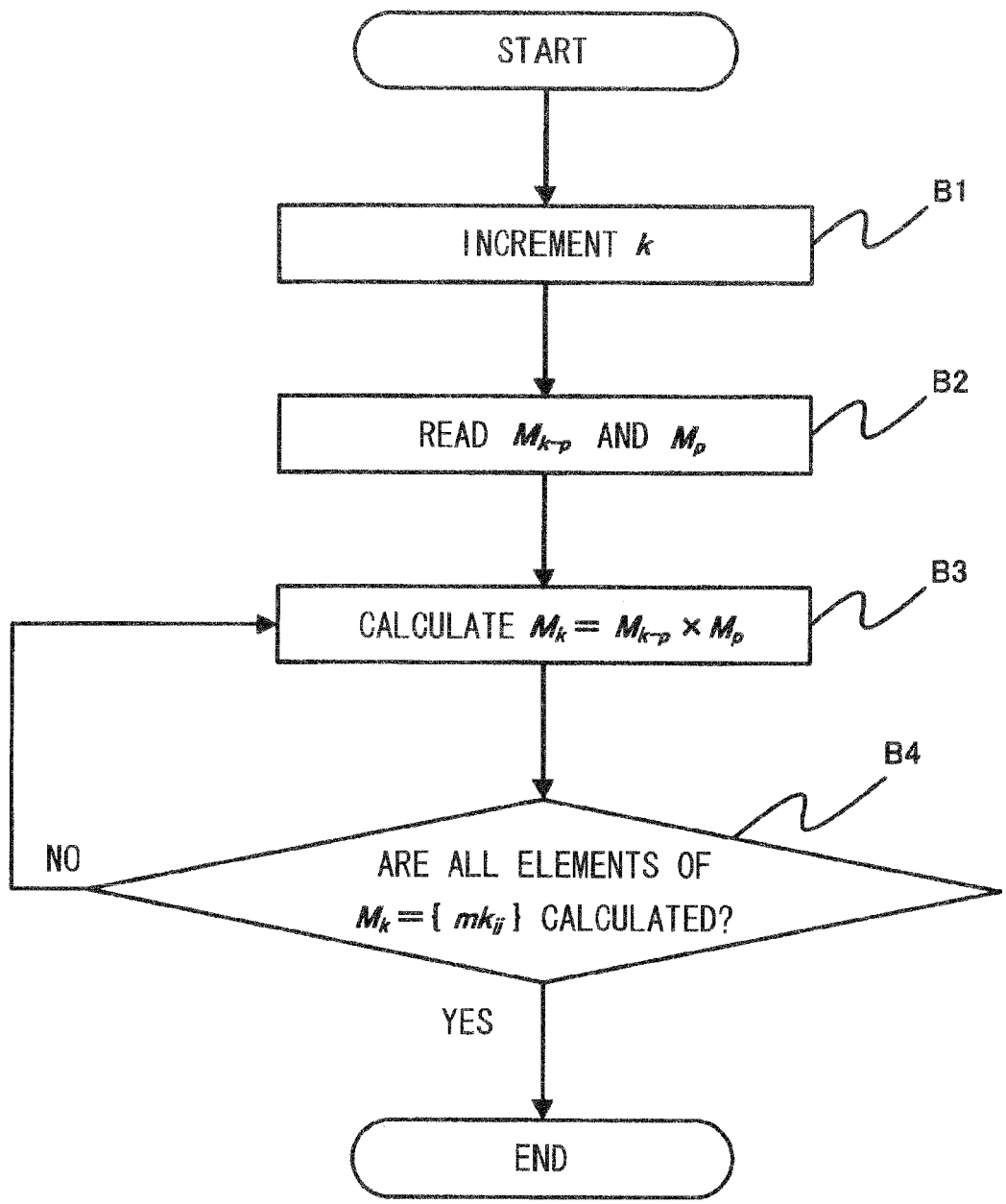
FIG. 4 is a flowchart showing step A3 in the flowchart showing the operation of the first exemplary embodiment of the present invention.

FIG. 4 is a flowchart showing the detailed operation in step A3. In step A3, the NFA conversion unit 21 first increments the variable k (step B1). In doing so, k is incremented in such a way that k=k×2 if the variable k×2 is less than or equal to the number of characters subjected to simultaneous/parallel processing, m, and that k=k+1 if it is not. Next, the NFA conversion unit 21 reads the already-stored NFA description matrices $M_{k-p}$ and $M_p$ from the NFA conversion result matrix storage unit 32 (step B2).

In the description below, the variable p is an integer greater than or equal to 1 and less than k, and there is no restriction on the matrices $M_{k-p}$ and $M_p$, which are read, as long as they are already calculated. Using those matrices, the k-character transition NFA description matrix $M_k$ is calculated by calculating the product of the matrix $M_{k-p}$ and $M_p$. In this calculation, the following definitions are used, and the calculation is carried out according to the definitions.

Assuming that a and b are each a character or a character string including $i_s$ and $f_s$, and 0 is a null set, the following definitions are used for the operation on the elements.

Definition 1 a×b=ab≠ba

Definition 2 a×0=0×a=0

Definition 3 $i_s \times a = i_s a$, $a \times i_s = 0$, $i_s \times i_s = i_s \, i_s$ Definition 4 $a \times f_s = a \, f_s$, $f_s \times a = 0$, $f_s \times f_s = f_s \, f_s$ To calculate $M_2 = M_1 \times M_1 = \{m2_{ij}\}$ i=1, . . . , 5, j=1, . . . , 5, k=2, p=1 using the one-character transition NFA description matrix $S = M_1$ in [Expression 1], the element $m2_{15}$, for example, is calculated by [Expression 2] given below.

$$\begin{aligned} m2_{15} &= m1_{11} \times m1_{15} + m1_{12} \times m1_{25} + m1_{13} \times \\ & \quad m1_{35} + m1_{14} \times m1_{45} + m1_{15} \times m1_{55} \\ &= i_s \times 0 + a \times 0 + 0 \times 0 + a \times (d+e) + 0 \times f_s \\ &= ad + ae \end{aligned} \quad \text{[Expression 2]}$$

Each element of $M_2$ is calculated in the same way as above and if it is judged that the calculation of all elements is completed (step B4), $M_2$ is calculated as in [Expression 3], and the NFA conversion unit 21 stores the two-character transition NFA description matrix $M_2$ in the NFA conversion result matrix storage unit 32.

$$M_2 = \begin{bmatrix} i_s i_s & i_s a & ab & i_s a & ad+ae \\ 0 & bc & 0 & bc & 0 \\ 0 & 0 & cb & 0 & cd+ce \\ 0 & 0 & 0 & 0 & df_s + ef_s \\ 0 & 0 & 0 & 0 & f_s f_s \end{bmatrix} \quad \text{[Expression 3]}$$

In addition, to calculate the four-character transition NFA description matrix $M_4$ when the number of characters subjected to simultaneous/parallel processing, m, is four, $M_4 = M_2 \times M_2$ is calculated (k=4, P=2) using two-character transition NFA description matrix $M_2$ to generate the four-character transition NFA description matrix $M_4$ shown in [Expression 4].

$$M_4 = \begin{bmatrix} i_s i_s i_s i_s & \begin{array}{c} i_s i_s i_s a + \\ i_s abc \end{array} & \begin{array}{c} i_s i_s ab + \\ abcb \end{array} & \begin{array}{c} i_s i_s i_s a + \\ i_s abc \end{array} & \begin{array}{c} i_s i_s ad + i_s i_s ae + \\ abcd + abce + \\ i_s adf_s + i_s aef_s + \\ adf_s f_s + aef_s f_s \end{array} \\ 0 & bcbc & 0 & bcbc & bcdf_s + bcef_s \\ 0 & 0 & cbcb & 0 & \begin{array}{c} cbcd + cbce + \\ cdf_s f_s + cef_s f \end{array} \\ 0 & 0 & 0 & 0 & df_s f_s f_s + ef_s f_s f_s \\ 0 & 0 & 0 & 0 & f_s f_s f_s f_s \end{bmatrix} \quad \text{[Expression 4]}$$

When the matrices to the desired m-character transition NFA description matrix are generated (step A2), the NFA conversion unit 21 reshapes the generated matrix $M_m$ (step A4). In this case, $i_s$ and $f_s$ in each element of the matrix are replaced by "*" that represents an arbitrary character. As a result, the four-character transition NFA description matrix $M_4$, shown in [Expression 4] is reshaped, for example, as shown in [Expression 5].

$$M_4 = \begin{bmatrix} ** & *a + *abc & ab + abcb & *a + *abc & \begin{array}{c} ad + ae + \\ abcd + abce + \\ *ad^* + *ae^* + \\ ad^{} + ae^{} \end{array} \\ 0 & bcbc & 0 & bcbc & bcd^* + bce^* \\ 0 & 0 & cbcb & 0 & \begin{array}{c} cbcd + cbce + \\ cd^{} + ce^{} \end{array} \\ 0 & 0 & 0 & 0 & d^{*} + e^{*} \\ 0 & 0 & 0 & 0 & **** \end{bmatrix} \quad \text{[Expression 5]}$$

Figure 5:
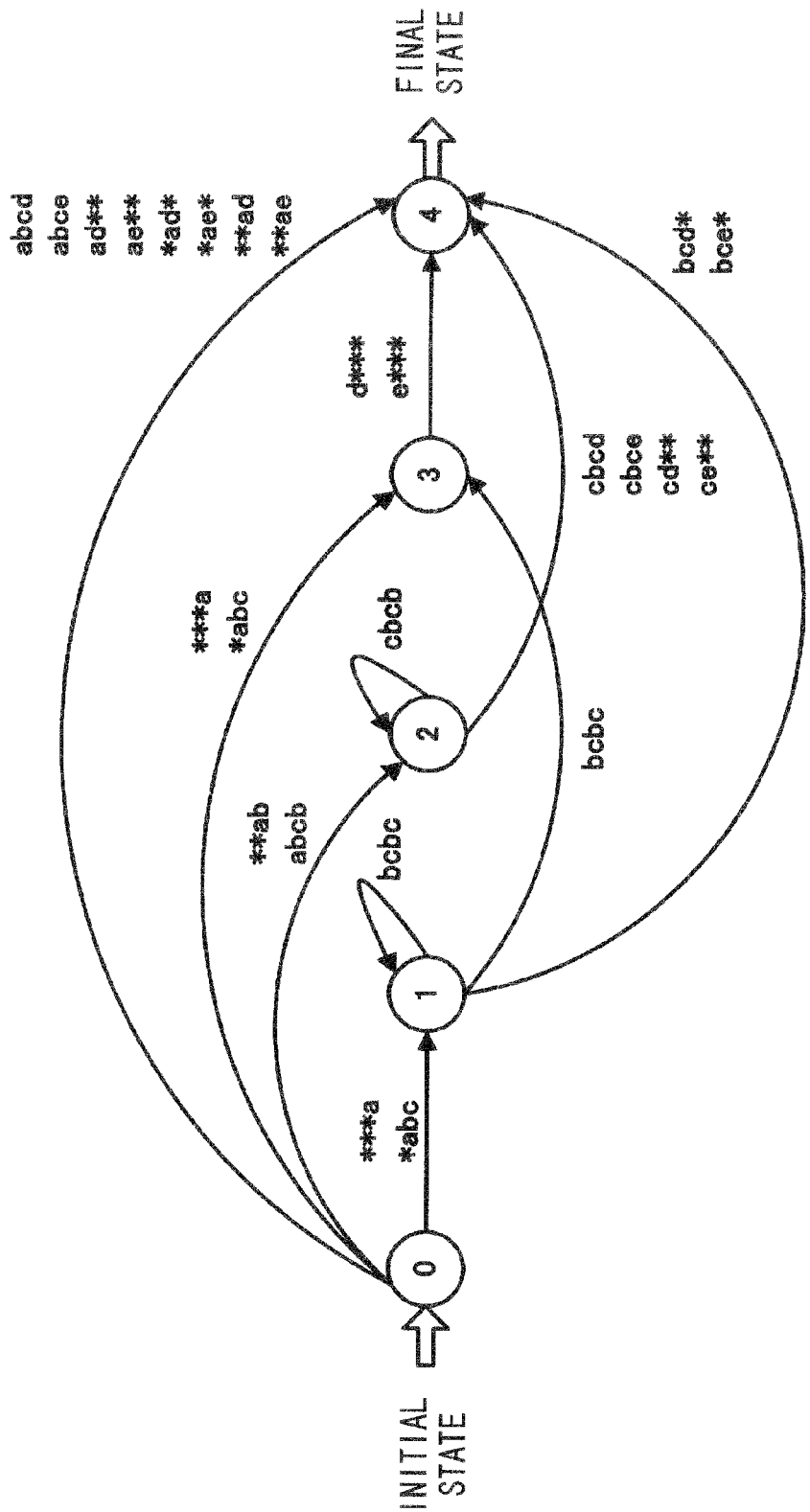
FIG. 5 is a diagram showing a four-character transition NFA description matrix of the present invention.

When the desired m-character transition NFA description matrix $M_m$ is generated, the NFA conversion unit 21 notifies the result output unit 22 that the result is obtained. The result output unit 22 reads $M_m$ from the NFA conversion result matrix storage unit 32 and outputs the result via the output device 4. At this time, the result output unit 22 creates a matrix form if the output form is an NFA description matrix, or creates a state transition diagram from the NFA description matrix $M_m$ if the output form is an NFA, and supplies it to the output device 4. For example, the state transition diagram of the four-character transition NFA description matrix $M_4$ shown in [Expression 5] is as shown in FIG. 5. Note that the transition condition "**" from state 0 to state 0, or from state 4 to state 4**, unit an arbitrary character string in the initial state or the final state and such an input character string has no meaning. For this reason, such an input character string is not shown in the figure. As described above, the matrix operation processing shown in expression 2 to expression 5 is performed according to the predefined operation rule shown in [Definition 1] to [Definition 4] described above.

In the first exemplary embodiment described above, a matrix is used for NFA conversion to convert a one-character transition NFA to an m-character transition NFA (m is the number of characters subjected to simultaneous/parallel processing) without changing the number of states of the original one-character transition NFA. In addition, only the intermediate result of NFA matrix conversion is stored in the NFA conversion result matrix storage unit 32 to allow an NFA to be converted with a smaller storage capacity. In addition, because k is increased using k of the currently-generated k-character transition NFA description matrix and the number of characters subjected to simultaneous/parallel processing, m, during the conversion, there is no need to serially calculate the k-character transition NFA description matrix until k reaches the number of characters subjected to simultaneous/parallel processing and, because the reshaping processing for the m-character transition NFA description matrix is performed last, there is no need to determine from which state, $i_s$ or $f_s$, "*" representing an arbitrary character is generated. As a result, the matrix operation processing is simplified and the generation speed is increased.

Although how the variable k is incremented is determined by comparing it with the number of characters subjected to simultaneous/parallel processing, m, in the above exemplary embodiment, it is also possible to increment the variable k always using k=k+1.

The configuration of the present invention may be applied not only to a non-deterministic finite automaton (NFA) but also to a deterministic finite automaton (DFA).

Next, a second exemplary embodiment of the present invention will be described in detail below with reference to the drawings.

Figure 6:
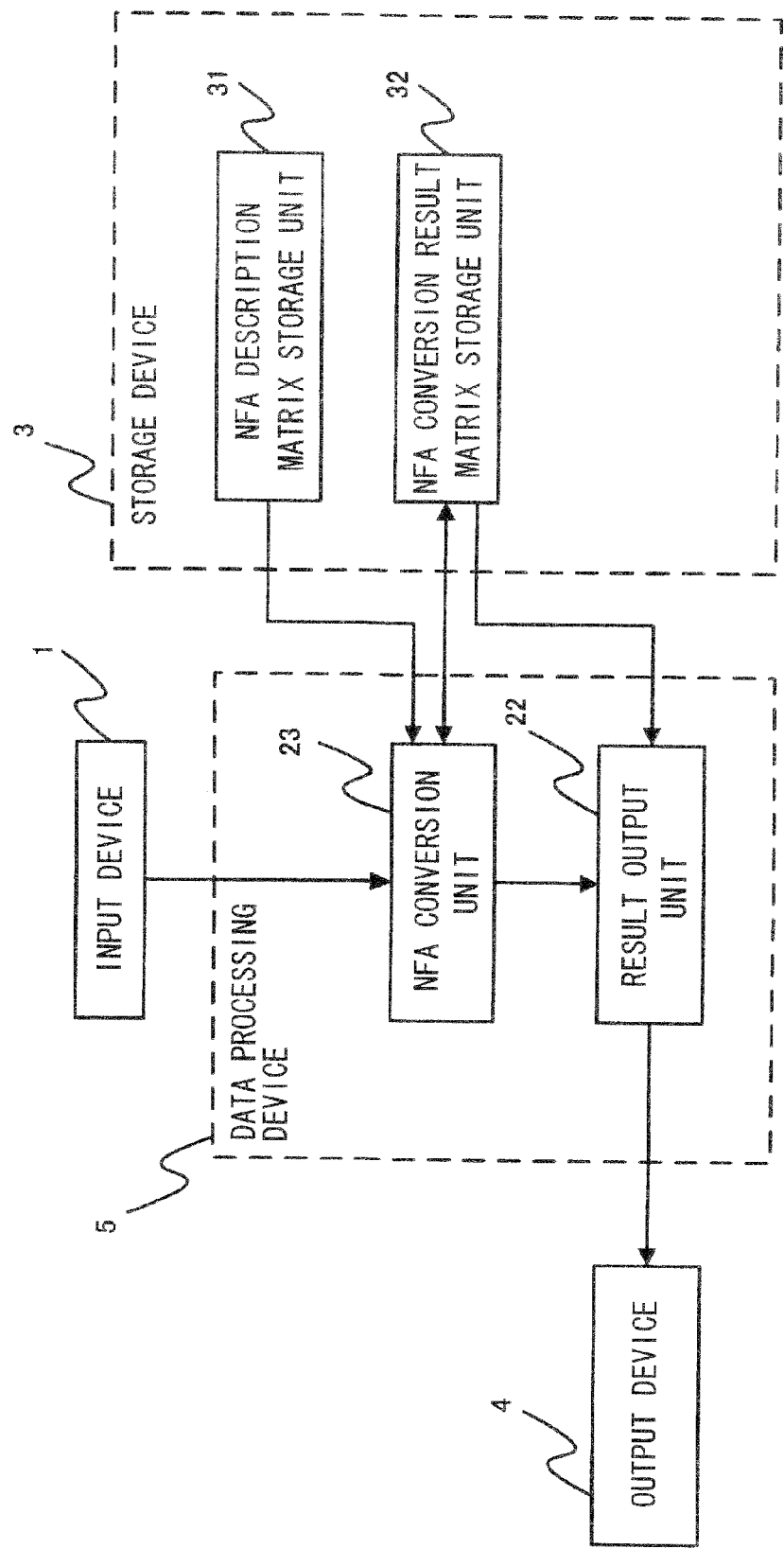
FIG. 6 is a block diagram showing the configuration of a second exemplary embodiment of the present invention.

FIG. 6 is a block diagram showing the configuration of the second exemplary embodiment for carrying out the present invention.

Referring to FIG. 6, a data processing device 5 in the second exemplary embodiment of the present invention is similar to the configuration of the data processing device 2 in the first exemplary embodiment shown in FIG. 1, except that the NFA conversion unit 21 is replaced by an NFA conversion unit 23. The other part of the configuration is the same as that of the first exemplary embodiment.

The data processing device 5 comprises an NFA conversion unit 23 and a result output unit 22.

The NFA conversion unit 23 reads a one-character transition NFA description matrix S or a p-character transition NFA description matrix $M_p$, respectively, from an NFA description matrix storage unit 31 or NFA conversion result matrix storage unit 32 as necessary, divides it into three sub-matrices for generating k-character transition NFA description matrix $M_k$, and stores the generated matrix $M_k$ again into the NFA conversion result matrix storage unit 32. In the description below, the sub-matrices S', Si, and Sa of the one-character transition NFA description matrix 5, and the three sub-matrices $M'_k$, $Mi_k$, and $Ma_k$ of the k-character transition NFA description matrix $M_k$, are used as the three sub-matrices. This processing is repeated until the m-character transition NFA is generated according to the value of the number of characters subjected to simultaneous/parallel processing, m, entered from an input device 1. The result output unit 22 is the same as that in the first exemplary embodiment and, so, the description is omitted here. It is of course possible to implement the processing and the function of the NFA conversion unit 23 and the result output unit 22 by the programs executed on the data processing device 5.

Figure 7:
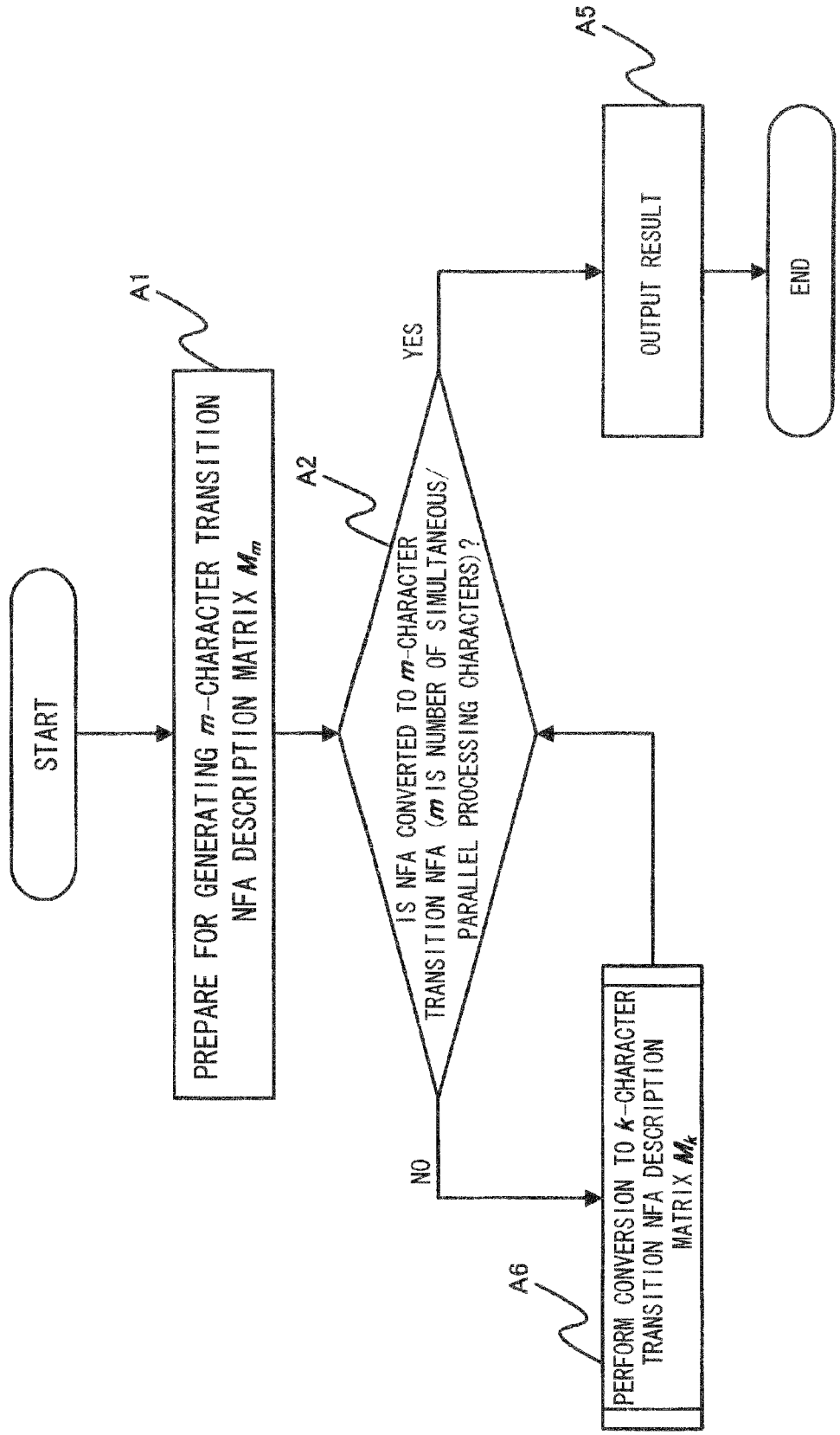
FIG. 7 is a flowchart showing the operation of the second exemplary embodiment of the present invention.

Next, the operation of the second exemplary embodiment for carrying out the present invention will be described with reference to FIG. 6 and FIG. 7.

The number of characters subjected to simultaneous/parallel processing, m, received from the input device 1, is supplied to the NFA conversion unit 23. First, to prepare for generating a desired m-character transition NFA description matrix $M_m$, the NFA conversion unit 23 sets the variable k to 1, sets the one-character transition NFA description matrix S, read from the NFA description matrix storage unit 31, to the matrix $M_1$, and stores the matrix $M_1$ in the NFA conversion result matrix storage unit 32 (step A1). The meaning of the NFA description matrices S and $M_1$ is the same as that in the first exemplary embodiment and so the description is omitted here.

After the above processing described above (step A1), the NFA conversion unit 23 compares the variable k and the number of characters subjected to simultaneous/parallel processing, m (step A2). If the number of characters subjected to simultaneous/parallel processing, m, is larger than the variable k, the processing of conversion to the k-character transition NFA is performed judging that the NFA is not yet converted to the desired m-character transition NFA (step A6).

Figure 8:
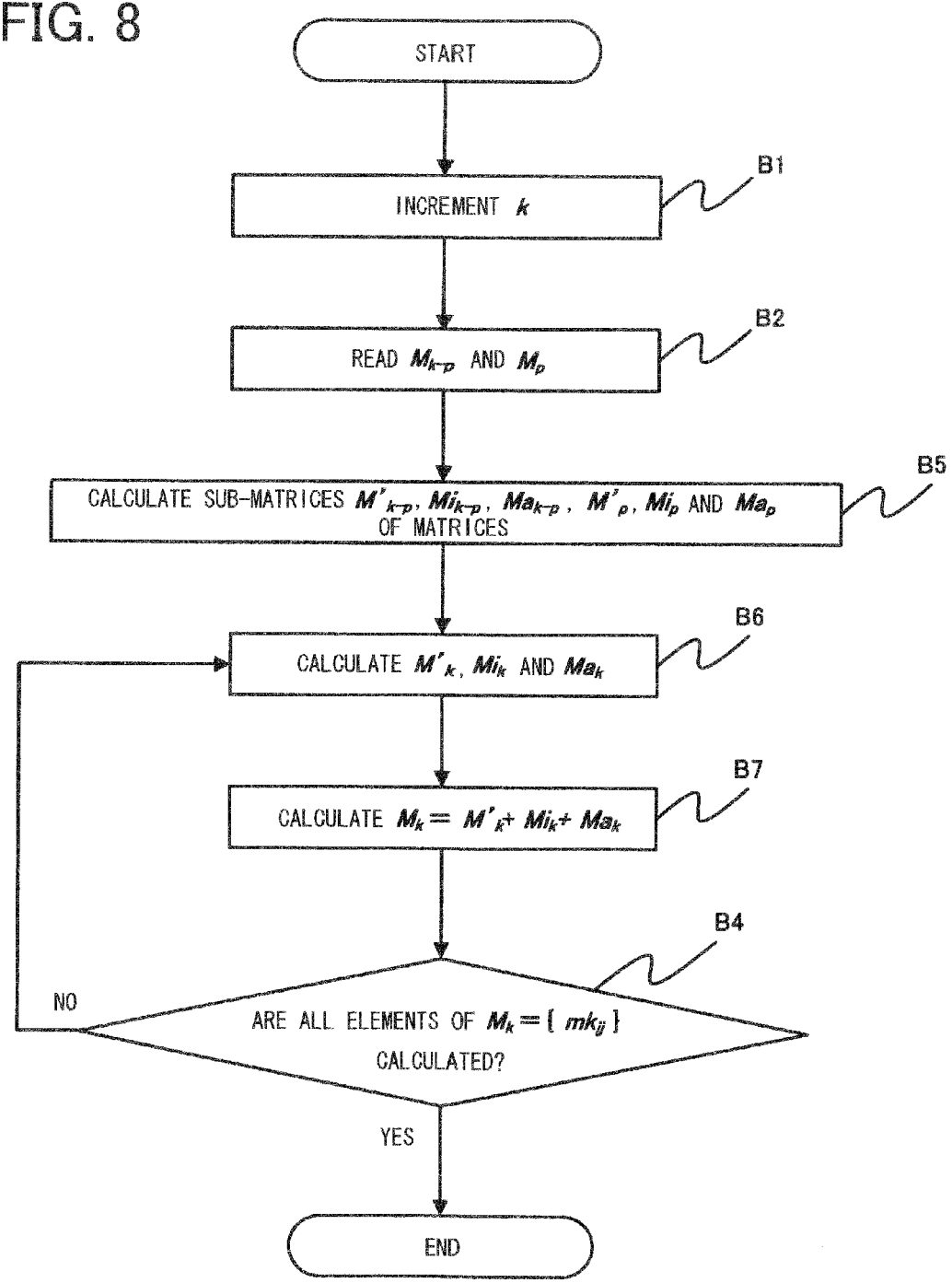
FIG. 8 is a flowchart showing step A6 in the flowchart showing the operation of the second exemplary embodiment of the present invention.

FIG. 8 is a flowchart showing the detailed operation in step A6, In step A6, the NFA conversion unit 23 first increments the variable k (step B1) and reads the already-stored NFA description matrices $M_{k-p}$ and $M_p$ from the NFA conversion result matrix storage unit 32 (step B2). Those methods are the same as those in the first exemplary embodiment and so the duplicated description is omitted here.

Next, sub-matrices $M'_{k-p}$, $Mi_{k-p}$, $Ma_{k-p}$, $M'_p$, $Mi_p$, and $Ma_p$ are calculated from the matrices $M_{k-p}$ and $M_p$ (step B5).

Here, the sub-matrices $M'_k$, $Mi_k$, and $Ma_k$ of the k-character transition NFA description matrix $M_k$k are defined as given below. First, the sub-matrices $M'_1$, $Mi_1$, and $Ma_1$ of the NFA description matrix $M_k$=S, when k=1 are defined as follows.

[Definition 5]: The sub-matrix $M'_1$ is a matrix each element of which is other than $i_s$ and $f_s$.

[Definition 6]: The sub-matrix $Mi_1$ has only $i_s$ as the elements, and this $i_s$ is replaced by "*" representing an arbitrary character.

[Definition 7]: The sub-matrix $Ma_1$ has only $f_s$ as the elements, and this $f_s$ is replaced by "*" representing an arbitrary character.

[Definition 8]: $M_1 = M'_1 + Mi_1 + Ma_1$

For example, when the description matrix S is represented as shown in [Expression 1], $M'_1$, $Mi_1$, $Ma_1$, and $M_1$ are represented as shown in [Expression 6].

$$M'_1 = \begin{bmatrix} 0 & a & 0 & a & 0 \\ 0 & 0 & b & 0 & 0 \\ 0 & c & 0 & c & 0 \\ 0 & 0 & 0 & 0 & d+e \\ 0 & 0 & 0 & 0 & 0 \end{bmatrix} \quad \text{[Expression 6]}$$

$$Mi_1 = \begin{bmatrix} * & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

$$Ma_1 = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & * \end{bmatrix}$$

$$M_1 = \begin{bmatrix} * & a & 0 & a & 0 \\ 0 & 0 & b & 0 & 0 \\ 0 & c & 0 & c & 0 \\ 0 & 0 & 0 & 0 & d+e \\ 0 & 0 & 0 & 0 & * \end{bmatrix}$$

When k is larger than 1, the sub-matrices $M'_k$, $Mi_k$, and $Ma_k$ of the NFA description matrix $M_k$ are defined as follows.

[Definition 9]: The sub-matrix $M'_k$ is a matrix each element of which is not terminated with "*". That is, the sub-matrix may have an element such as "a ..." but does not have an element such as "... a"

[Definition 10]: The sub-matrix $Mi_k$ has only elements, such as "* ...", each of which is the product of "*" generated by replacing $i_s$ indicating the initial state.

[Definition 11] The sub-matrix $Ma_k$ is a matrix having only elements each of which is terminated with "*". That is, the sub-matrix has only elements such as "... a**".

The NFA conversion unit 23 uses the sub-matrices, such as those described above, to calculate the sub-matrices $M'_k$, $Mi_k$, and $Ma_k$ of the k-character transition NFA description matrix $M_k$. In this calculation, definition 1 to definition 4 defined in the first exemplary embodiment are used. Calculating $M_k = M_{k-p} \times M_p$ using definition 1 to definition 4 derives [Expression 7] given below.

$$M_k = M_{k-p} \times M_p \quad \text{[Expression 7]}$$
$$= (M'_{k-p} + Mi_{k-p} + Ma_{k-p}) \times$$
$$(M'_p + Mi_p + Ma_p)$$
$$= M'_{k-p} \times M'_p + M'_{k-p} \times Mi_p + M'_{k-p} \times Ma_p +$$
$$Mi_{k-p} \times M'_p + Mi_{k-p} \times Mi_p + Mi_{k-p} \times Ma_p +$$
$$Ma_{k-p} \times M'_p + Ma_{k-p} \times Mi_p + Ma_{k-p} \times Ma_p$$

From definitions 3 and 4, $M'_{k-p} \times Mi_p = 0$, $Ma_{k-p} \times M'_p = 0$, $Ma_{k-p} \times Mi_p = 0$ and so [Expression 7] is represented by [Expression 8] given below.

$$M_k = M'_{k-p} \times M'_p + M'_{k-p} \times Ma_p + Mi_{k-p} \times M'_p + \quad \text{[Expression 8]}$$
$$Mi_{k-p} \times Mi_p + Mi_{k-p} \times Ma_p + Ma_{k-p} \times Ma_p$$
$$= (M'_{k-p} + Mi_{k-p}) \times M'_p +$$
$$(M'_{k-p} + Mi_{k-p} + Ma_{k-p}) \times Ma_p + Mi_{k-p} \times$$
$$Mi_p$$

Based on definitions 9, 10, and 11 and on [Expression 8], the sub-matrices $M'_k$, $Mi_k$, and $Ma_k$ of the k-character transition NFA description matrix $M_k$ are defined as shown in [Expression 9]. Note that, in the calculation in [Expression 9], the calculation is carried out by treating "*", which indicates an arbitrary character, as an ordinary character.

$$M'_k = (M'_{k-p} + Mi_{k-p}) \times M'_p$$

$$Mi_k = Mi_{k-p} \times Mi_p$$

$$Ma_k = (M'_{k-p} + Mi_{k-p} + Ma_{k-p}) \times Ma_p = M_{k-p} \times Ma_p$$

$$M_k = M'_k + Mi_k + Ma_k \quad \text{[Expression 9]}$$

When the sub-matrices $M'_{k-p}$, $Mi_{k-p}$, $Ma_{k-p}$, $M'_p$, $Mi_p$, and $Ma_p$ are calculated, respectively, from the matrices $M_{k-p}$ and $M_p$, read from the NFA conversion result matrix storage unit 32 (step B5), the NFA conversion unit 23 calculates $M'_k$, $Mi_k$, and $Ma_k$ from [Expression 9] given above (step B6). After k-character transition NFA description matrix. $M_k$ is calculated by calculating their sum (step B7) and it is judged that the calculation of all elements is completed (step B4), the NFA conversion unit 23 stores k-character transition NFA description matrix $M_k$ in the NFA conversion result matrix storage unit 32.

For example, when the sub-matrices of $M_2$ and the sum are calculated using the sub-matrices of the one-character transition NFA description matrix $S=M_1$ (Expression 6) of the regular expression "a(bc)*(d|e)" shown in FIG. 3, the result is as shown in [Expression 10].

$$M'_2 = \begin{bmatrix} 0 & *a & ab & *a & ad+ae \\ 0 & bc & 0 & bc & 0 \\ 0 & 0 & cb & 0 & cd+ce \\ 0 & 0 & 0 & 0 & 0 \\ 0 & 0 & 0 & 0 & 0 \end{bmatrix} \quad \text{[Expression 10]}$$

$$Mi_2 = \begin{bmatrix} ** & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

$$Ma_2 = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & d^*+e^* \\ 0 & 0 & 0 & 0 & ** \end{bmatrix}$$

$$M_2 = \begin{bmatrix} ** & *a & ab & *a & ad+ae \\ 0 & bc & 0 & bc & 0 \\ 0 & 0 & cb & 0 & cd+ce \\ 0 & 0 & 0 & 0 & d^*+e^* \\ 0 & 0 & 0 & 0 & ** \end{bmatrix}$$

In addition, to calculate the four-character transition NFA description matrix $M_4$ when the number of characters subjected to simultaneous/parallel processing, m, is 4, the sub-matrices of the two-character transition NFA description matrix $M_2$ are used for calculating $M_4$ (k=4, p=2) to produce the sub-matrices of the four-character transition NFA description matrix $M_4$ and $M_4$ shown in [Expression 11].

$$M'_4 = \begin{bmatrix} 0 & ^{***}a+^*abc & ^{}ab+abcb & ^{*}a+^*abc & ^{}ad+^{}ae+abcd+abce \\ 0 & bcbc & 0 & bcbc & 0 \\ 0 & 0 & cbcb & 0 & cbcd+cbce \\ 0 & 0 & 0 & 0 & 0 \\ 0 & 0 & 0 & 0 & 0 \end{bmatrix}$$ [Expression 11]

$$Mi_4 = \begin{bmatrix} ^{****} & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

$$Ma_4 = \begin{bmatrix} 0 & 0 & 0 & 0 & ^*ad^*+^*ae^*+ad^{}+ae^{} \\ 0 & 0 & 0 & 0 & bcd^*+bce^* \\ 0 & 0 & 0 & 0 & cd^{}+ce^{} \\ 0 & 0 & 0 & 0 & d^{*}+e^{*} \\ 0 & 0 & 0 & 0 & ^{****} \end{bmatrix}$$

$$M_4 = \begin{bmatrix} ^{**} & ^{*}a+^*abc & ^{}ab+abcb & ^{*}a+^*abc & ^{}ad+^{}ae+abcd+abce+ad^*+^*ae^*+ad^{}+ae^{} \\ 0 & bcbc & 0 & bcbc & bcd^*+bce^* \\ 0 & 0 & cbcb & 0 & cbcd+cbce+cd^{}+ce^{} \\ 0 & 0 & 0 & 0 & d^{*}+e^{*} \\ 0 & 0 & 0 & 0 & ^{****} \end{bmatrix}$$

When the NFA description matrices to the desired m-character transition NFA description matrix are calculated (step A2), the NFA conversion unit 23 notifies the result output unit 22 that the result is obtained. The description of the subsequent operation is omitted here because the operation is the same as that of the first exemplary embodiment.

In the second exemplary embodiment described above, matrices are used for NFA conversion, as in the first exemplary embodiment, to convert an NFA to an m-character transition NFA (m is the number of characters subjected to simultaneous/parallel processing) without changing the number of states of the original one-character transition NFA. In addition, because definition 1 to definition 4 are already taken into consideration in the matrix calculation of the NFA conversion unit, there is no need to check the elements during the calculation. As a result, this method requires the generation of sub-matrices but eliminates the need to perform processing such as branch processing, thus increasing the generation speed.

Although how the variable k is incremented in this exemplary embodiment is determined by comparing the variable with the number of characters subjected to simultaneous/parallel processing, m, in the same way as in the first exemplary embodiment, the variable may also be incremented always by k=k+1. This exemplary embodiment may be applied not only to a non-deterministic finite automaton (NFA) but also to a deterministic finite automaton (DFA).

Next, a third exemplary embodiment for carrying out the present invention will be described in detail below with reference to the drawings.

Figure 9:
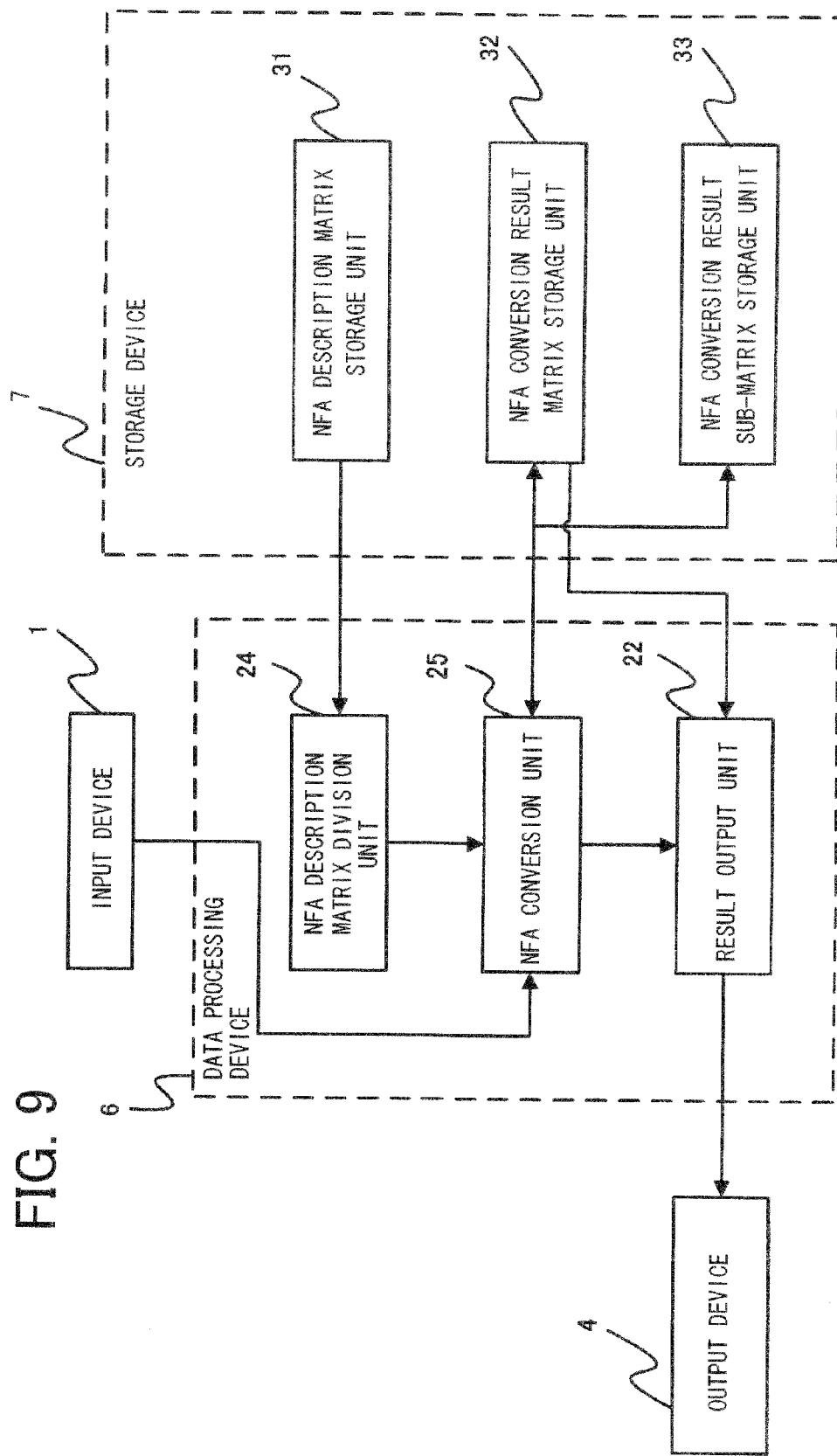
FIG. 9 is a block diagram showing the configuration of a third exemplary embodiment of the present invention.

FIG. 9 is a block diagram showing the configuration of the third exemplary embodiment for carrying out the present invention.

Referring to FIG. 9, a data processing device 6 in the third exemplary embodiment of the present invention is similar in configuration to the data processing device 5 in the second exemplary embodiment shown in FIG. 6 except that the NFA conversion unit 23 is replaced by an NFA conversion unit 25 and that an NFA description matrix division unit 24 is further provided. A storage device 7 is similar to the storage device 3 in the second exemplary embodiment shown in FIG. 6 except that an NFA conversion result sub-matrix storage unit 33 is further provided. The other part of the configuration is the same as that of the second exemplary embodiment.

The data processing device 6 comprises an NFA description matrix division unit 24, an NFA conversion unit 25, and a result output unit 22.

The NFA description matrix division unit 24 reads a one-character transition NFA description matrix S from an NFA description matrix storage unit 31, divides the matrix into sub-matrices S', Si, and Sa, and supplies those matrices, as well as the one-character transition NFA description matrix S, to the NFA conversion unit 25.

The NFA conversion unit 25 receives the NFA description matrix S and its sub-matrices S', Si, and Sa from the NFA description matrix division unit 24 as a one-character transition NFA description matrix $M_1$ and its sub-matrices $M'_1$, $Mi_1$, and $Ma_1$, and stores $M_1$ into the NFA conversion result matrix storage unit 32, and the sub-matrices $M'_1$, $Mi_1$, and $Ma_1$ into the NFA conversion result sub-matrix storage unit 33. The NFA conversion unit 25 reads, as necessary, k-p-character transition NFA description matrix $M_{k-p}$ and its sub-matrices $M'_{k-p}$, $Mi_{k-p}$, and $Ma_{k-p}$, which are already converted and stored in the NFA conversion result matrix storage unit 32 and the NFA conversion result sub-matrix storage unit 33, as well as the p-character transition NFA description matrix $M_p$ and its sub-matrices $M'_p$, $Mi_p$, and $Ma_p$ and, using them, generates sub-matrices $M'_k$, $Mi_k$, and $Ma_k$ of the k-character transition NFA description matrix $M_k$, calculates the sum to generate $M_k$, and stores the generated matrices in the NFA conversion result matrix storage unit 32 and the NFA conversion result sub-matrix storage unit 33 again. Because the meanings of various types of matrices and the result output unit 22 are the same as those in the second exemplary embodiment, the description is omitted here.

The storage device 7 comprises the NFA description matrix storage unit 31, NFA conversion result matrix storage unit 32, and NFA conversion result sub-matrix storage unit 33.

The NFA conversion result sub-matrix storage unit 33 stores the sub-matrices $M'_k$, $Mi_k$, and $Ma_k$ of the k-character transition NFA description matrix $M_k$. The NFA description matrix storage unit 31 and the NFA conversion result matrix storage unit 32 are the same as those in the second exemplary embodiment and so the description is omitted here. It is of course possible in this exemplary embodiment to implement the processing and function of the NFA description matrix division unit 24, NFA conversion unit 25, and result output unit 22 by the programs executed on the data processing device 6.

Figure 10:
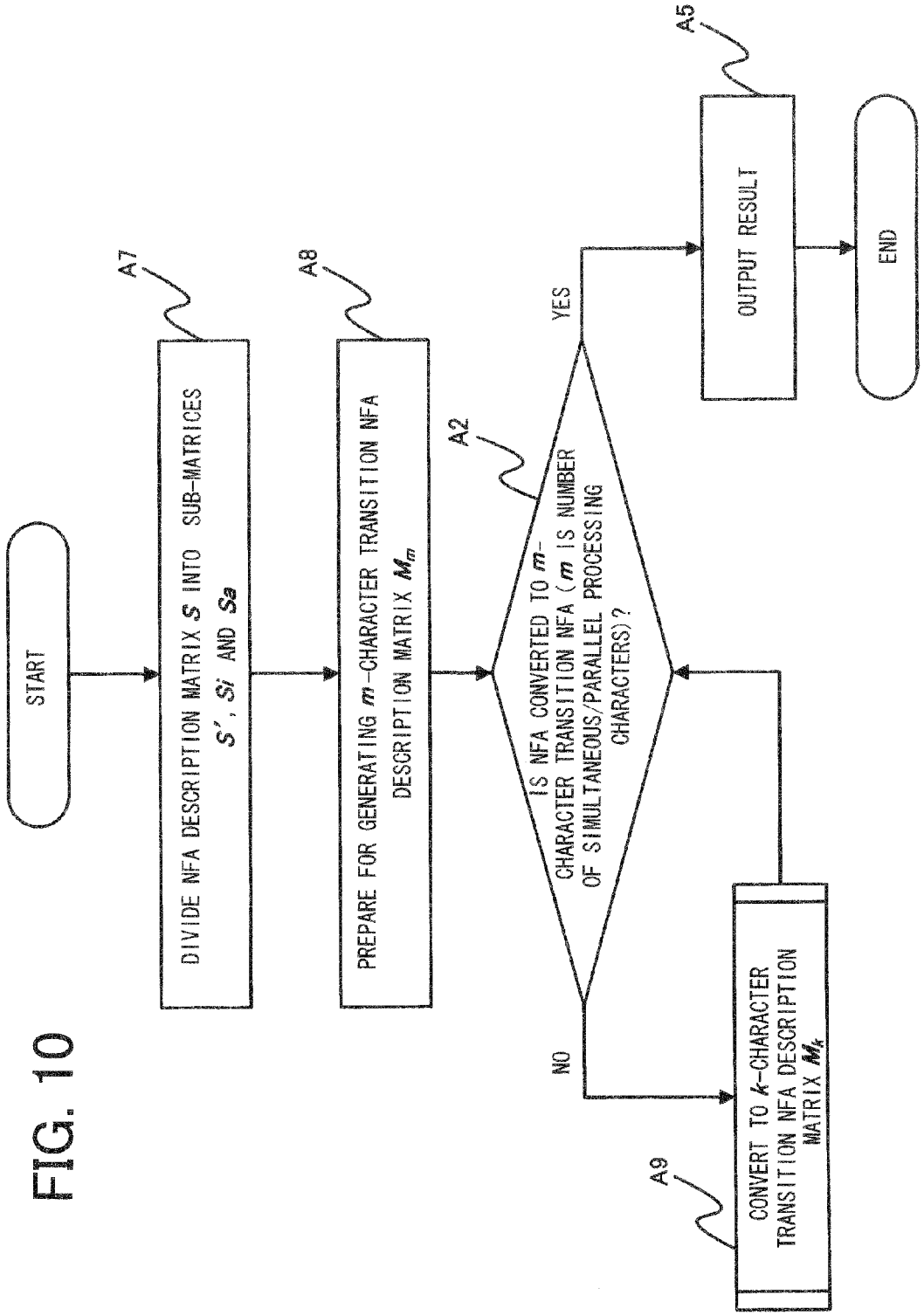
FIG. 10 is a flowchart showing the operation of the third exemplary embodiment of the present invention.

Next, by referring to FIG. 9 and FIG. 10, the following describes in detail the operation of the third exemplary embodiment for carrying out the present invention.

The number of characters subjected to simultaneous/parallel processing, m, received from an input device 1 is supplied to the NFA conversion unit 25. The NFA description matrix division unit 24 divides the one-character transition NFA description matrix S, read from the NFA description matrix storage unit 31, into sub-matrices S', Si, and Sa (step A7). The NFA description matrix division meansunit 24 supplies those matrices to the NFA conversion unit 25. The NFA conversion unit 25 stores the matrices, received from the NFA description matrix division unit 24, as a one-character transition NFA description matrix $M_1$ and its sub-matrices $M'_1$, $Mi_1$, and $Ma_1$; that is, the NFA conversion unit 25 stores $M_1$ into the NFA conversion result matrix storage unit 32, and the sub-matrices $M'_1$, $Mi_1$ and $Ma_1$ into the NFA conversion result sub-matrix storage unit 33 (step A8).

The meanings of the NFA description matrix S and $M_1$ and the meanings of their sub-matrices are the same those in the second exemplary embodiment and so the description is omitted here.

After the processing described above (step A8), the NFA conversion unit 25 compares the variable k and the number of characters subjected to simultaneous/parallel processing, m (step A2). If the number of characters subjected to simultaneous/parallel processing, m, is larger than variable k, the NFA conversion unit 25 performs conversion to a k-character transition NFA judging that the NFA is not yet converted to the desired m-character transition NFA (step A9).

Figure 11:
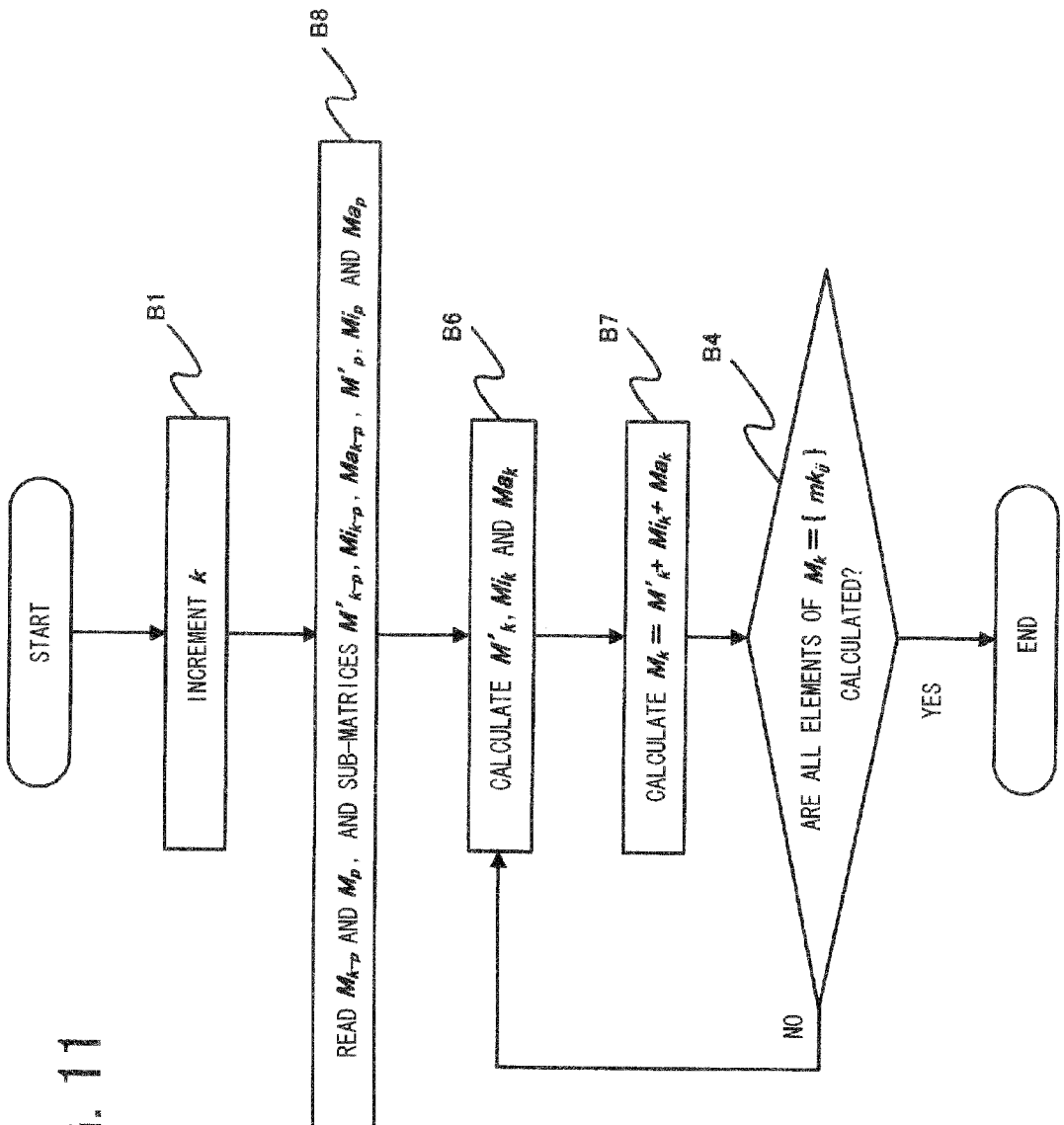
FIG. 11 is a flowchart showing step A9 in the flowchart showing the operation of the third exemplary embodiment of the present invention.

FIG. 11 is a flowchart showing the detailed operation in step A9. In step A9, the NFA conversion unit 25 first increments the variable k (step B1) and reads the already stored NFA description matrix $M_{k-p}$ and $M_p$ from the NFA conversion result matrix storage unit 32, and the sub-matrices $M'_{k-p}$, $Mi_{k-p}$, $Ma_{k-p}$, $M'_p$, $Mi_p$, and $Ma_p$ of the NFA description matrices $M_{k-p}$ and $M_p$ from the NFA conversion result sub-matrix storage unit 33 (step B8). The subsequent operation is the same as that of the second exemplary embodiment except that not only the calculated k-character transition NFA description matrix $M_k$ is stored in the NFA conversion result matrix storage unit 32 but also its sub-matrices $M'_k$, $Mi_k$, and $Ma_k$ are stored in the NFA conversion result sub-matrix storage unit 33, and so the description is omitted here.

In the third exemplary embodiment described above, the NFA conversion unit performs the matrix operation, in which not only the converted k-character transition NFA description matrix $M_k$ is stored but also its sub-matrices $M'_k$, $Mi_k$, and $Ma_k$ are stored in the NFA conversion result sub-matrix storage unit 33, and so there is no need to divide a matrix into sub-matrices each time the NFA conversion unit repeats the conversion. This configuration therefore increases the generation speed of a k-character transition NFA description matrix.

Although how the variable k is incremented is determined by comparing it with the number of characters subjected to simultaneous/parallel processing, m, in the above exemplary embodiment as in the first and second exemplary embodiments, it is also possible to increment the variable k always using k=k+1. This exemplary embodiment may be applied not only to a non-deterministic finite automaton (NFA) but also to a deterministic finite automaton (DFA).

Next, a fourth exemplary embodiment for carrying out the present invention will be described in detail below with reference to the drawings.

Figure 12:
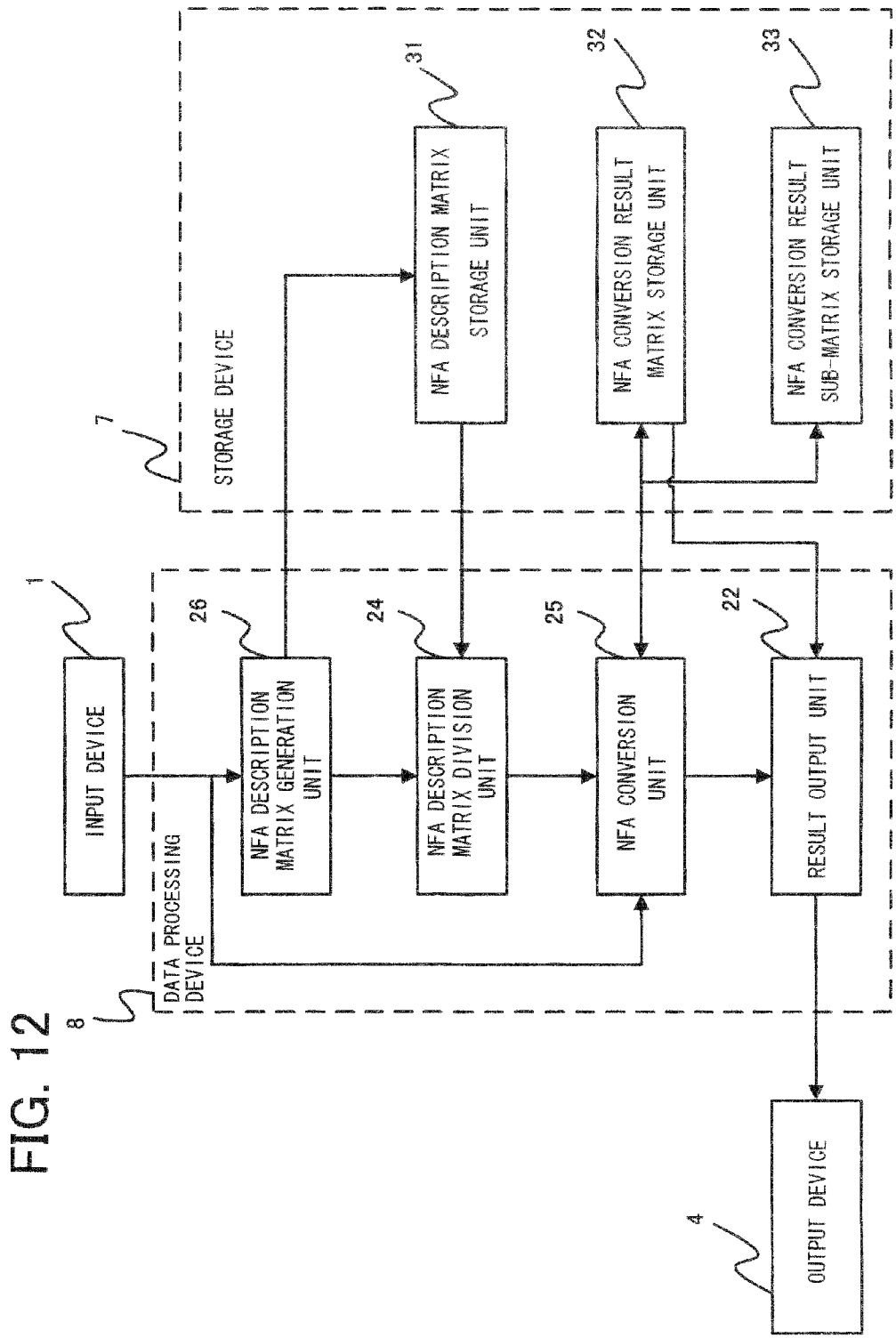
FIG. 12 is a block diagram showing the configuration of a fourth exemplary embodiment of the present invention.

FIG. 12 is a block diagram showing the configuration of the fourth exemplary embodiment for carrying out the present invention.

Referring to FIG. 12, a data processing device 8 in the fourth exemplary embodiment of the present invention is similar in configuration to the data processing device 6 in the third exemplary embodiment shown in FIG. 9 except that NFA description matrix generation unit 26 is further provided. The other part of the configuration is the same as that of the third exemplary embodiment.

The data processing device 8 comprises an NFA description matrix generation unit 26, an NFA description matrix division means unit 24, an NFA conversion unit 25, and a result output unit 22.

The NFA description matrix generation unit 26 receives a regular expression itself from an input device 1. When a regular expression is received, the NFA description matrix generation unit 26 generates a syntax tree from the regular expression and, from that syntax tree, generates a one-character transition NFA. The NFA description matrix generation unit 26 generates an NFA description matrix S from the generated NFA and stores it in the NFA description matrix storage unit 31. It is of course possible in this exemplary embodiment to implement the processing and function of the NFA description matrix generation unit 26, NFA description matrix division unit 24, NFA conversion unit 25, and result output unit 22 by the programs executed on the data processing device 8.

Figure 13:
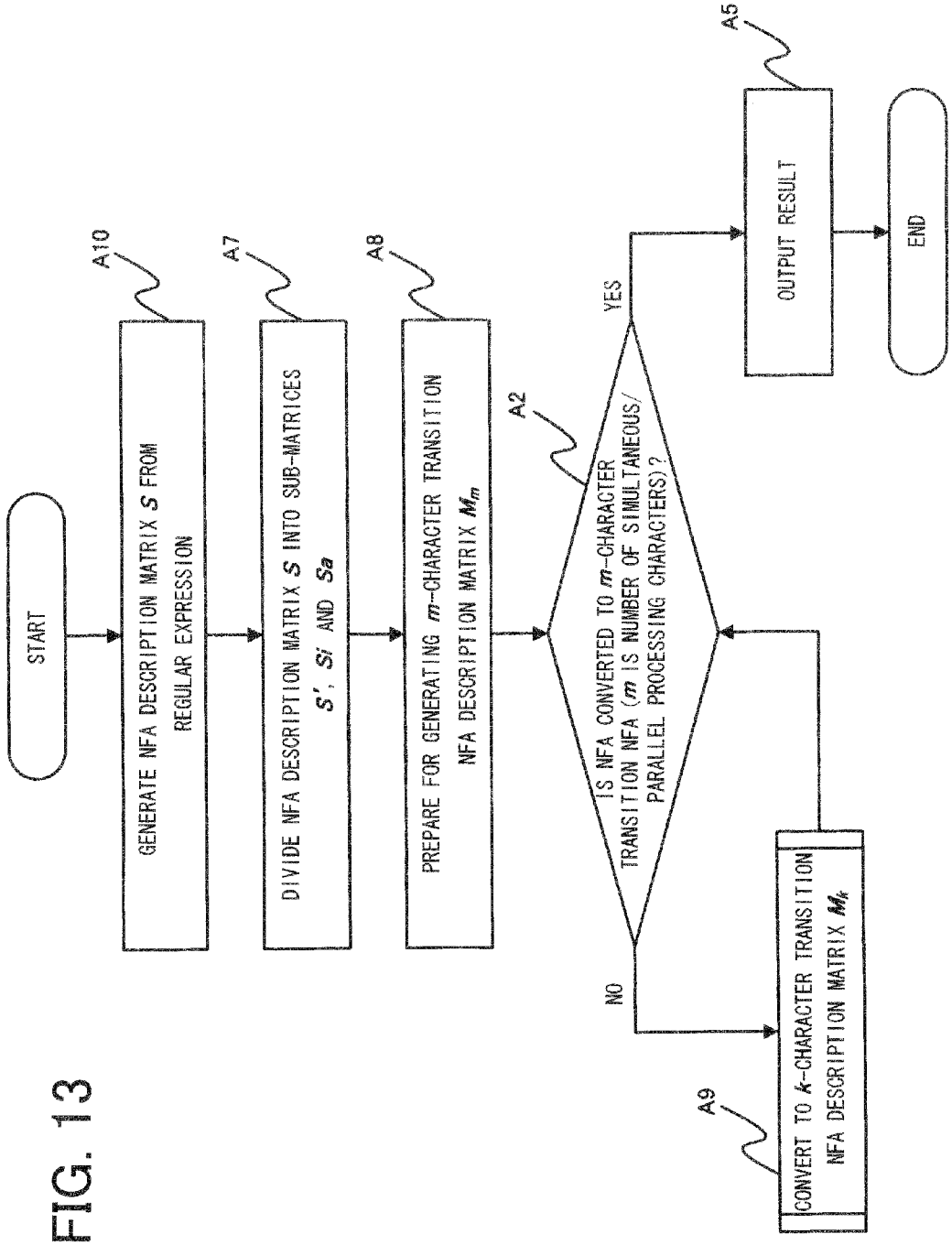
FIG. 13 is a flowchart showing the operation of the fourth exemplary embodiment of the present invention.

Next, by referring to FIG. 12 and FIG. 13, the following describes in detail the operation of the fourth exemplary embodiment for carrying out the present invention.

The number of characters subjected to simultaneous/parallel processing, m, received from the input device 1, is supplied to the NFA conversion unit 25. In addition, a regular expression itself is supplied from the input device 1 to the NFA description matrix generation unit 26. The NFA description matrix generation unit 26 constructs a syntax tree based on the regular expressions such as those described in [Non-Patent Document 1] and generates a one-character transition NFA from the syntax tree. In general, because a list describing the transition destination state from each state and its transition condition is available when a method like this is used in which an NFA is constructed from a regular expression, the NFA description matrix generation unit 26 generates an NFA description matrix S from the list and stores the generated NFA description matrix S in the NFA description matrix storage unit 31 (step A10). The subsequent processing is the same as that of the third exemplary embodiment and so the detailed description is omitted here.

In the fourth exemplary embodiment described above, when an NFA description matrix is not stored in advance in the NFA description matrix storage unit 31, it is possible to receive a regular expression, to construct an NFA using the existing NFA construction method, and to generate its NFA description matrix S. This configuration makes it possible to generate an NFA description matrix that allows for an m-character transition (m is the number of characters subjected to simultaneous/parallel processing) based on a regular expression provided in a flexible manner.

Although the fourth exemplary embodiment described above has a configuration in which the NFA description matrix generation unit 26 is added to the configuration of the third exemplary embodiment, it is also possible to generate an NFA description matrix, which makes an m-character transition (m is specified number of characters subjected to simultaneous/parallel processing), from a given regular expression by adding the similar NFA description matrix generation unit 26 to the configuration of the first exemplary embodiment and the second exemplary embodiment.

Although the units of the processing device and the storage device are configured by hard ware in the first to fourth exemplary embodiments described above, it is also possible to provide a part or all of those units as a program that causes an information processing device to perform the functions of the units.

INDUSTRIAL APPLICABILITY

Examples of application of the present invention include a program for generating an automaton for speedily performing the attack/intrusion rule pattern-matching processing in an Intrusion Detection System (IDS) or an Intrusion Prevention System (IPS) that detect an attack against, or an intrusion into, network services. The present invention is also applicable to the generation of an automaton for use in the software-based pattern matching processing included in a personal computer or a workstation.

The embodiments and the examples may be changed and adjusted in the scope of all disclosures (including claims) of the present invention and based on the basic technological concept thereof. In the scope of the claims of the present invention, various disclosed elements may be combined and selected in a variety of ways. That is, it is to be understood that the present invention includes various modifications and changes that may be made by those skilled in the art based on all disclosures including claims and on the technical concept.

The invention claimed is:

1. A finite automaton generation system comprising:
    an NFA conversion unit that increases a number of characters of a transition condition of a finite automaton which has a transition condition with a fixed number of characters, to any specified number of characters; and
    a result output unit that outputs a finite automaton that has a transition condition with the number of characters thereof increased to any specified number of characters, wherein said NFA conversion unit and the result output unit are configured out of hardware.

2. The finite automaton generation system according to claim 1, wherein the finite automaton is described in a matrix form.

3. The finite automaton generation system according to claim 2, wherein the NFA conversion unit is configured to operate according to a matrix operation having a predefined operation rule.

4. The finite automaton generation system according to claim 2, wherein the NFA conversion unit is configured to apply a predefined operation rule to a matrix operation in which a plurality of sub-matrices are used.

5. The finite automaton generation system according to claim 4, wherein the matrix operation, in which a plurality of sub-matrices are used, generates and uses sub-matrices, each time the operation is performed.

6. The finite automaton generation system according to claim 4, wherein the matrix operation, in which a plurality of sub-matrices are used, generates sub-matrices in advance and uses the sub-matrices.

7. The finite automaton generation system according to claim 1, wherein the NFA conversion unit does not change a number of states of a new finite automaton.

8. The finite automaton generation system according to claim 1, comprising:
    an NFA description matrix storage unit that stores a finite automaton that is described in a matrix form in advance and has a transition condition with a fixed number of characters;
    the NFA conversion unit that performs conversion in which a number of characters of a transition condition of the finite automaton, stored in the NFA description matrix storage unit and described as a matrix, is increased;
    an NFA conversion result matrix storage unit that stores a finite automaton description matrix halfway-converted by the NFA conversion unit; and
    the result output unit that outputs a finite automaton that has a transition condition with the number of characters thereof increased to any specified number of characters.

9. The finite automaton generation system according to claim 8, wherein the NFA conversion unit generates a finite automaton for a specified number of characters subjected to simultaneous/parallel processing by repeating processing in which a one-character transition finite automaton description matrix or a p-character transition finite automaton description matrix is read respectively from the NFA description matrix storage unit or the NFA conversion result matrix storage unit, the finite automaton description matrix, which has been read, is divided into a plurality of sub-matrices to generate a k-character transition finite automaton description matrix, and the generated k-character transition finite automaton description matrix is stored into the NFA conversion result matrix storage unit.

10. The finite automaton generation system according to claim 8, wherein the result output unit outputs a finite automaton, whose transition condition has the number of characters increased to the any specified number of characters, in a matrix form and/or a state transition diagram.

11. The finite automaton generation system according to claim 1, comprising:
    an NFA description matrix storage unit that stores a finite automaton that is described in a matrix form in advance and has a transition condition with a fixed number of characters;
    an NFA description matrix division unit that divides the matrix, which is stored in the NFA description matrix storage unit and which describes a finite automaton, into a plurality of sub-matrices;
    the NFA conversion unit that performs conversion in which a number of characters of a transition condition of a new finite automaton is increased by using the plurality of divided sub-matrices;
    an NFA conversion result matrix storage unit that stores a finite automaton description matrix halfway-converted by the NFA conversion unit;
    an NFA conversion result sub-matrix storage unit that stores a plurality of sub-matrices of the finite automaton description matrix halfway-converted by the NFA conversion unit; and
    the result output unit that outputs a finite automaton that has the transition condition with a number of characters thereof increased to any specified number of characters.

12. The finite automaton generation system according to claim 1, wherein the NFA conversion unit converts a received regular expression to a finite automaton having a one-character transition condition and increases the number of characters of a transition condition of the converted finite automaton to any number of characters.

13. The finite automaton generation system according to claim 1, comprising:
    an NFA description matrix generation unit that converts a received regular expression to a matrix that describes a finite automaton having a one-character transition condition;
    an NFA description matrix storage unit that stores the matrix converted by the NFA description matrix generation unit;
    the NFA conversion unit that performs conversion in which a number of characters of a transition condition of the finite automaton, described by the matrix stored in the NFA description matrix storage unit, is increased;
    an NFA conversion result matrix storage unit that stores a finite automaton description matrix halfway-converted by the NFA conversion unit; and
    the result output unit that outputs a finite automaton that has the transition condition with a number of characters thereof increased to any specified number of characters.

14. The finite automaton generation system according to claim 1, comprising:
- an NFA description matrix generation unit that converts a received regular expression to a matrix that describes a finite automaton having a one-character transition condition;
- an NFA description matrix storage unit that stores the matrix converted by the NFA description matrix generation unit;
- an NFA description matrix division unit that divides the matrix, which is stored in the NFA description matrix storage unit and which describes a finite automaton, into a plurality of sub-matrices;
- the NFA conversion unit that performs conversion in which a number of characters of a transition condition of a new finite automaton is increased by using the plurality of divided sub-matrices;
- an NFA conversion result matrix storage unit that stores a finite automaton description matrix halfway-converted by the NFA conversion unit;
- an NFA conversion result sub-matrix storage unit that stores a plurality of sub-matrices of the finite automaton description matrix halfway-converted by the NFA conversion unit; and
- the result output unit that outputs a finite automaton that has the transition condition with a number of characters thereof increased to any specified number of characters.

15. A finite automaton generation method, comprising:
- increasing a number of characters of a finite automaton transition condition which includes a transition condition with a fixed number of characters, to any specified number of characters; and
- outputting a finite automaton that has a transition condition with the number of characters thereof increased to any specified number of characters.

16. The finite automaton generation method according to claim 15, comprising:
- storing a finite automaton that is described in a matrix form in advance and has a transition condition with a fixed number of characters;
- dividing the matrix, which describes the stored finite automaton, into a plurality of sub-matrices;
- performing conversion in which a number of characters of a transition condition of a new finite automaton is increased by using the plurality of divided sub-matrices;
- storing a halfway-converted finite automaton description matrix;
- storing a plurality of sub-matrices of the halfway-converted finite automaton description matrix; and
- outputting a finite automaton that has the transition condition with a number of characters thereof increased to any specified number of characters.

17. The finite automaton generation method according to claim 15, comprising:
- converting a received regular expression to a matrix that describes a finite automaton having a one-character transition condition;
- storing the converted matrix;
- performing conversion in which a number of characters of a transition condition of the finite automaton, described by the stored matrix, is increased;
- storing a halfway-converted finite automaton description matrix; and
- outputting a finite automaton that has the transition condition with a number of characters thereof increased to any specified number of characters.

18. A non-transitory computer-readable recording medium storing a program causing a computer to execute the processing comprising:
- increasing a number of characters of a finite automaton transition condition, which has a transition condition with a fixed number of characters, to any specified number of characters; and
- outputting a finite automaton that has a transition condition with the number of characters thereof increased to any specified number of characters.

19. The non-transitory computer-readable recording medium according to claim 18, causing the computer to execute:
- an NFA description matrix storing processing that stores a finite automaton that is described in a matrix form in advance and has a transition condition with a fixed number of characters;
- an NFA description matrix division processing that divides a description matrix of the stored finite automaton into a plurality of sub-matrices;
- an NFA conversion processing that performs conversion in which a number of characters of a transition condition of a new finite automaton is increased by using the plurality of divided sub-matrices;
- an NFA conversion result matrix storing processing that stores a finite automaton description matrix halfway-converted by the NFA conversion processing;
- an NFA conversion result sub-matrix storing processing that stores a plurality of sub-matrices of the finite automaton description matrix halfway-converted by the NFA conversion processing; and
- a result output processing that outputs a finite automaton that has the transition condition with a number of characters thereof increased to any specified number of characters.

20. The non-transitory computer-readable recording medium according to claim 18, causing the computer to execute:
- an NFA description matrix generation processing that converts a received regular expression to a matrix that describes a finite automaton having a one-character transition condition;
- an NFA description matrix storing processing that stores the matrix converted by the NFA description matrix generation processing;
- an NFA conversion processing that performs conversion in which a number of characters of a transition condition of the finite automaton, described by the matrix stored by the NFA description matrix storing processing, is increased;
- an NFA conversion result matrix storing processing that stores a finite automaton description matrix halfway-converted by the NFA conversion processing; and
- a result output processing that outputs a finite automaton that has the transition condition with a number of characters thereof increased to any specified number of characters.

* * * * *

UNITED STATES PATENT AND TRADEMARK OFFICE
CERTIFICATE OF CORRECTION

PATENT NO.        : 8,612,376 B2                                              Page 1 of 1
APPLICATION NO.   : 12/521636
DATED             : December 17, 2013
INVENTOR(S)       : Yamagaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this
Twenty-second Day of September, 2015

Michelle K. Lee
*Director of the United States Patent and Trademark Office*